G. E. ROW.
TRUCK.
APPLICATION FILED APR. 13, 1910.

967,061. Patented Aug. 9, 1910.

WITNESSES:

INVENTOR
George E. Row
BY
ATTORNEYS

UNITED STATES PATENT OFFICE.

GEORGE EDWARD ROW, OF OMAHA, NEBRASKA.

TRUCK.

967,061.  Specification of Letters Patent.  Patented Aug. 9, 1910.

Application filed April 13, 1910. Serial No. 555,140.

*To all whom it may concern:*

Be it known that I, GEORGE EDWARD ROW, a citizen of the United States, and a resident of Omaha, in the county of Douglas and State of Nebraska, have invented a new and Improved Truck, of which the following is a full, clear, and exact description.

My invention relates to trucks for vehicles, particularly for railway cars and the like, and has for an object to provide a truck in which the separate wheel-sets can be independently and quickly removed from the truck body, the truck, when assembled, possessing shock-absorbing features, adapted to minimize the jarring of the car body, occasioned by the contact of the wheels and rails. For the purpose mentioned use is made of a journal box provided with extended members for removable engagement with the side pieces of the truck, and so arranged that the shock of the contacting rails and wheels will be substantially absorbed by the journal box and adjacent members.

Reference is to be had to the accompanying drawings forming a part of this specification, in which similar characters of reference indicate corresponding parts in all the views, and in which—

Figure 1:
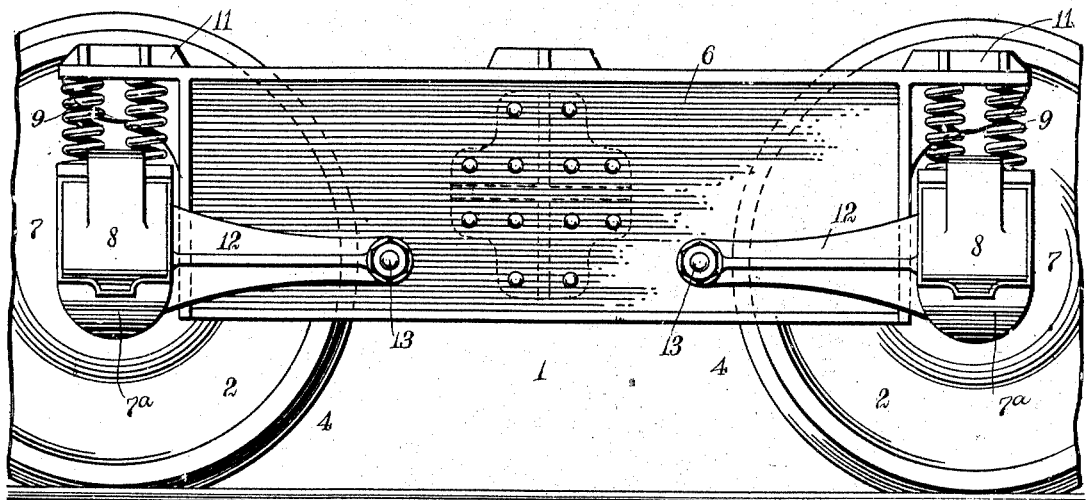
Figure 2:
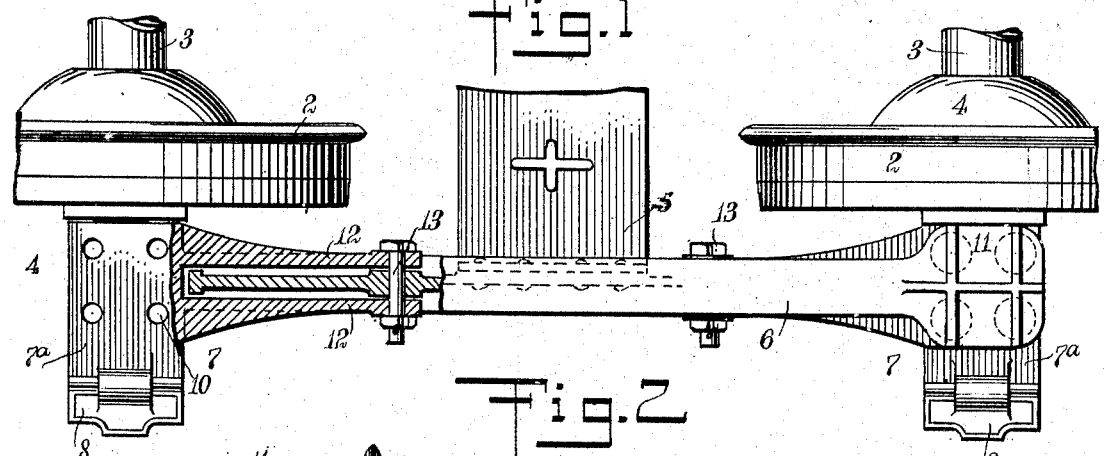
Figure 3:
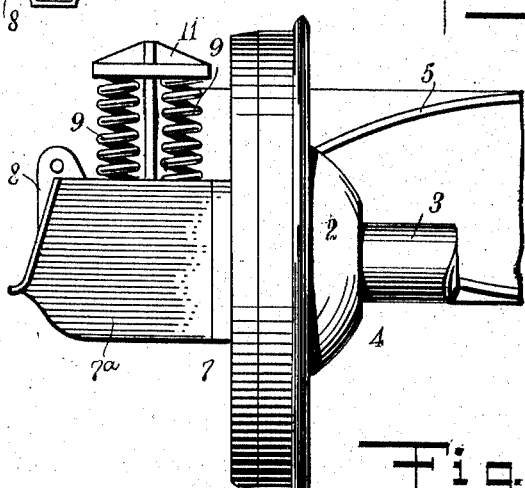
Figure 4:
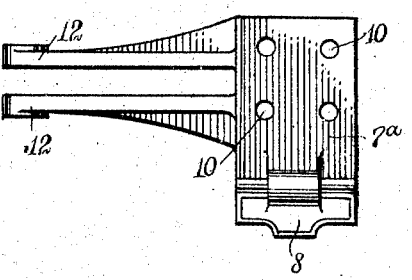

Figure 1 is a side elevation of my car truck; Fig. 2 is a partial plan view of my truck, parts being broken away to disclose the underlying structure; Fig. 3 is a partial end view disclosing a wheel of my truck mounted on a rail, and Fig. 4 is a plan view of the journal box constituting a part of my truck.

Referring more particularly to the various views, I provide a truck 1 having wheels 2, mounted on axles 3 and comprising wheel-sets 4, one of each of the wheel-sets 4 being mounted on a truck body 5. On each side of the truck 1 a side piece 6 is mounted, preferably having an I-beam form of construction. The ends of the axles 3 are mounted in bearings of journal boxes 7, comprising a casing 7ª having a cover 8. Suitable springs 9 are provided, disposed in seats 10 on the casing 7, and the side pieces 6 are interposed between the journal boxes 7 with the ends 11 of the side pieces contacting with the springs 9, so that a spring cushion is formed for the side pieces to rest upon. Integral with the journal boxes 7 are outwardly-extending spaced members 12. The members 12 are adapted to incase a portion of the side pieces 6, as will be easily seen in Fig. 1, and are removably secured to the side pieces 6 by bolts 13 passed through the members 12 and the side pieces 6, as will be easily seen by referring to Fig. 2.

In the use of my device, the trucks 1 are adapted to support a car body, mounted on the side pieces 6, cushioned on the journal boxes 7. When a downward stress is exerted on the car body, the side pieces move downward and the members 12 being pivoted to the side pieces 6, the downward thrust is absorbed by the members 12 and the springs 9. Should the wheels in contact with the rails cause a jar or any slight vibration, the same is absorbed by the members 12 and the springs 9, so that the car body will not receive any concussion whatever.

From the foregoing description it will be seen that a safe, reliable and comfort-affording truck is provided, with parts of the same easily removable and adapted to constitute a cushion for absorbing shocks.

Although I have shown a particular construction for the purpose of describing my invention, it will be understood that I do not limit myself thereto, the scope of my invention being fully defined in the appended claims.

Having thus described my invention, I claim as new and desire to secure by Letters Patent:

1. A car truck having side pieces, journal boxes, and spaced members movably connecting the side pieces and adjacent journal boxes.

2. A car truck having side pieces, journal boxes, and spaced link members movably connecting the side pieces and adjacent journal boxes.

3. A car truck having wheel sets, journal boxes, side pieces and spaced members movably connecting the side pieces and adjacent journal boxes.

4. A car truck having wheel sets, journal boxes, side pieces and spaced link members movably connecting the side pieces and adjacent journal boxes.

5. A car truck having wheel sets, side pieces interposed between adjacent journal boxes and a movable connection between the side pieces and adjacent journal boxes.

6. A car truck having wheel sets, side pieces interposed between adjacent journal boxes, and spaced members pivotally mounted intermediate the side pieces and adjacent journal boxes.

7. A car truck having wheel sets, journal boxes, side pieces and spaced members integral with the journal box and movably interposed between the side pieces and adjacent journal boxes.

8. A car truck having wheel sets, journal boxes, side pieces and spaced link members integral with the journal box and movably interposed between the side pieces and adjacent journal boxes.

9. A car truck having side pieces, journal boxes, a spring connection therebetween, and a spaced link connection integral with the journal box and interposed between the side pieces and adjacent journal boxes.

In testimony whereof I have signed my name to this specification in the presence of two subscribing witnesses.

GEORGE EDWARD ROW.

Witnesses:
H. FISCHER,
H. P. ELSASSER.